US010417422B2

(12) United States Patent
Zhang et al.

(10) Patent No.: US 10,417,422 B2
(45) Date of Patent: Sep. 17, 2019

(54) METHOD AND APPARATUS FOR DETECTING APPLICATION

(71) Applicant: Baidu Online Network Technology (Beijing) Co., Ltd., Beijing (CN)

(72) Inventors: Yulong Zhang, Beijing (CN); Tao Wei, Beijing (CN)

(73) Assignee: Baidu Online Network Technology (Beijing) Co., Ltd, Beijing (CN)

( * ) Notice: Subject to any disclaimer, the term of this patent is extended or adjusted under 35 U.S.C. 154(b) by 187 days.

(21) Appl. No.: 15/605,668

(22) Filed: May 25, 2017

(65) Prior Publication Data
US 2018/0114019 A1    Apr. 26, 2018

(30) Foreign Application Priority Data
Oct. 24, 2016 (CN) .......................... 2016 1 0924983

(51) Int. Cl.
*G06F 21/56* (2013.01)
*G06F 17/27* (2006.01)
(Continued)

(52) U.S. Cl.
CPC .............. *G06F 21/563* (2013.01); *G06F 8/53* (2013.01); *G06F 17/274* (2013.01);
(Continued)

(58) Field of Classification Search
CPC ........ G06F 21/563; G06F 21/562; G06F 8/54; G06F 21/56; G06F 21/52
(Continued)

(56) References Cited

U.S. PATENT DOCUMENTS 8,312,545 B2 * 11/2012 Tuvell .................... G06F 21/56
726/24
9,177,153 B1 * 11/2015 Perrig .................... G06F 21/57
(Continued)

FOREIGN PATENT DOCUMENTS

CN          105335649 A   *   2/2016
CN          106203048 A   *  12/2016

OTHER PUBLICATIONS

Auxilia.M, et al., Anomaly detection using negative security model in web application, 2010, IEEE Xplore, 2010 International Conference on Computer Information Systems and Industrial Management Applications (CISIM), pp. 481-486.*
(Continued)

*Primary Examiner* — Farid Homayounmehr
*Assistant Examiner* — Raied A Salman
(74) *Attorney, Agent, or Firm* — Knobbe Martens Olson & Bear LLP

(57) ABSTRACT

The present disclosure discloses a method and an apparatus for detecting an application. The method comprises: disassembling a binary program of an application running on a target device to generate a to-be-recovered assembly program; selecting, from the to-be-recovered assembly program, a function having function information consistent with function information of a preset reference function in a reference assembly program to obtain at least one candidate function; selecting, among the at least one candidate function, a candidate function having grammatical and/or semantic information consistent with grammatical and/or semantic information of the preset reference function as an object function; selecting, from the object function, a variable having grammatical and/or semantic information consistent with grammatical and/or semantic information of a preset reference variable in the preset reference function as a target variable; and outputting positional information of the object
(Continued)

function and the target variable in the to-be-recovered assembly program as a detection result.

19 Claims, 5 Drawing Sheets

(51) Int. Cl.
  *G06F 21/57* (2013.01)
  *G06F 8/53* (2018.01)
(52) U.S. Cl.
  CPC ........ *G06F 17/2785* (2013.01); *G06F 21/577* (2013.01); *G06F 2221/033* (2013.01)
(58) Field of Classification Search
  USPC ...................................... 726/25, 23; 717/163
  See application file for complete search history.

(56) References Cited

U.S. PATENT DOCUMENTS

| | | | | |
|---|---|---|---|---|
| 9,223,554 | B1* | 12/2015 | Lawson | G06F 8/54 |
| 9,612,840 | B2* | 4/2017 | Khartikov | G06F 9/30145 |
| 9,635,033 | B2* | 4/2017 | Nguyen-Tuong | G06F 21/51 |
| 9,672,019 | B2* | 6/2017 | Sager | G06F 8/4442 |
| 9,870,471 | B2* | 1/2018 | Shen | G06F 21/52 |
| 2007/0239993 | A1* | 10/2007 | Sokolsky | G06F 21/563 |
| | | | | 713/188 |
| 2015/0058984 | A1 | 2/2015 | Shen et al. | |

OTHER PUBLICATIONS

Bruschi et al., "Code Normalization for Self-Mutating Malware," Malware, IEEE Security & Privacy, Mar./Apr. 2007, pp. 46-54, IEEE Computer Society.

\* cited by examiner

METHOD AND APPARATUS FOR DETECTING APPLICATION

CROSS-REFERENCE TO RELATED APPLICATION

This application is related to and claims priority from Chinese Application No. 201610924983.7, filed on Oct. 24, 2016 and entitled "Method and Apparatus for Detecting Application", the entire disclosure of which is hereby incorporated by reference.

TECHNICAL FIELD

The present disclosure relates to the field of computer technologies, particularly to the field of information security technologies, and more particularly to a method and an apparatus for detecting an application.

BACKGROUND

A 0-day vulnerability is a vulnerability whose related cracking occurs within the shortest time after software or something else is issued. Other than the 0-day vulnerability, a vulnerability which has been disclosed but is not timely fixed on numerous devices is referred to as an N-day vulnerability. In most cases, the N-day vulnerability has mature and widespread vulnerability exploitation. Therefore, underground industries mainly utilize the N-day vulnerability to break through the security protection mechanism installed in devices. Device manufacturers cannot concentrate on finding and fixing N-day vulnerabilities like manufacturers having security capability. Therefore, the device manufacturers need to cooperate with the security manufacturers to fix the N-day vulnerabilities.

However, the existing application detecting method generally needs source codes of the device, but the security manufacturers have difficulty in obtaining the device source codes. Therefore, a flexible mechanism is urgently needed to effectively detect applications running on the devices.

SUMMARY

An objective of the present disclosure is to provide an improved method and apparatus for detecting an application, in order to solve the technical problem mentioned in the foregoing Background section.

In a first aspect, the present disclosure provides a method for detecting an application. The method comprises: disassembling a binary program of an application running on a target device to generate a to-be-recovered assembly program; selecting, from the to-be-recovered assembly program, a function having function information consistent with function information of a preset reference function in a reference assembly program to obtain at least one candidate function; selecting, among the at least one candidate function, a candidate function having grammatical and/or semantic information consistent with grammatical and/or semantic information of the preset reference function as an object function; selecting, from the object function, a variable having grammatical and/or semantic information consistent with grammatical and/or semantic information of a preset reference variable in the preset reference function as a target variable; and outputting positional information of the object function and the target variable in the to-be-recovered assembly program as a detection result.

In some embodiments, the selecting, from the to-be-recovered assembly program, a function having function information consistent with function information of a preset reference function in a reference assembly program to obtain at least one candidate function comprises: extracting respectively at least one item of function information of the preset reference function and at least one item of function information of each function in the to-be-recovered assembly program to generate a function information set of the preset reference function and a function information set of the each function in the to-be-recovered assembly program; calculating a similarity between the function information set of the preset reference function and the function information set of the each function in the to-be-recovered assembly program, respectively; and selecting the candidate function from the each function in the to-be-recovered assembly program based on a result of calculating the similarity.

In some embodiments, the selecting, among the at least one candidate function, a candidate function having grammatical and/or semantic information consistent with grammatical and/or semantic information of the preset reference function as an object function comprises: extracting respectively at least one item of grammatical and/or semantic information of the preset reference function and at least one item of grammatical and/or semantic information of each candidate function to generate a grammatical and/or semantic information set of the preset reference function and a grammatical and/or semantic information set of the each candidate function; calculating a similarity between the grammatical and/or semantic information set of the preset reference function and the grammatical and/or semantic information set of the each candidate function, respectively; and selecting the object function from the each candidate function based on a result of calculating the similarity.

In some embodiments, the selecting, from the object function, a variable having grammatical and/or semantic information consistent with grammatical and/or semantic information of a preset reference variable in the preset reference function as a target variable comprises: extracting respectively at least one item of grammatical and/or semantic information of the preset reference variable and at least one item of grammatical and/or semantic information of each variable in the object function to generate a grammatical and/or semantic information set of the preset reference variable and a grammatical and/or semantic feature set of the each variable in the object function; calculating a similarity between the grammatical and/or semantic information set of the preset reference variable and the grammatical and/or semantic information set of the each variable in the object function, respectively; and selecting the target variable from the each variable in the object function based on a result of calculating the similarity.

In some embodiments, the positional information of the object function and the target variable in the to-be-recovered assembly program comprises a starting address of the object function and an offset of the target variable.

In some embodiments, the function information comprises at least one of: a function name, a constant in the function, and a calling relationship of the function.

In some embodiments, the grammatical and/or semantic information of the function comprises at least one of: a number of basic blocks, a control flow graph, an output corresponding to a sample input, and an analytical result of symbolic execution.

In some embodiments, the grammatical and/or semantic information of the variable comprises at least one of: a variable name, dependency relationship of the variable in a data flow or a control flow, and an analytical result of symbolic execution.

In some embodiments, the calculating a similarity comprises a minimum hash algorithm.

In a second aspect, the present disclosure provides an apparatus for detecting an application. The apparatus comprises: a disassembling unit, configured to disassemble a binary program of an application running on a target device to generate a to-be-recovered assembly program; a first selecting unit, configured to select, from the to-be-recovered assembly program, a function having function information consistent with function information of a preset reference function in a reference assembly program to obtain at least one candidate function; a second selecting unit, configured to select, among the at least one candidate function, a candidate function having grammatical and/or semantic information consistent with grammatical and/or semantic information of the preset reference function as an object function; a third selecting unit, configured to select, from the object function, a variable having grammatical and/or semantic information consistent with grammatical and/or semantic information of a preset reference variable in the preset reference function as a target variable; and an outputting unit, configured to output positional information of the object function and the target variable in the to-be-recovered assembly program as a detection result.

In some embodiments, the first selecting unit comprises: a first extracting subunit, configured to extract respectively at least one item of function information of the preset reference function and at least one item of function information of each function in the to-be-recovered assembly program to generate a function information set of the preset reference function and a function information set of the each function in the to-be-recovered assembly program; a first similarity calculating subunit, configured to calculating a similarity between the function information set of the preset reference function and the function information set of the each function in the to-be-recovered assembly program, respectively; and a first selecting subunit, configured to select the candidate function from the each function in the to-be-recovered assembly program based on a result of calculating the similarity.

In some embodiments, the second selecting unit comprises: a second extracting subunit, configured to extract respectively at least one item of grammatical and/or semantic information of the preset reference function and at least one item of grammatical and/or semantic information of each candidate function to generate a grammatical and/or semantic information set of the preset reference function and a grammatical and/or semantic information set of the each candidate function; a second similarity calculating subunit, configured to calculate a similarity between the grammatical and/or semantic information set of the preset reference function and the grammatical and/or semantic information set of the each candidate function, respectively; and a second selecting subunit, configured to select the object function from the each candidate function based on a result of calculating the similarity.

In some embodiments, the third selecting unit comprises: a third extracting subunit, configured to extract respectively at least one item of grammatical and/or semantic information of the preset reference variable and at least one item of grammatical and/or semantic information of each variable in the object function to generate a grammatical and/or semantic information set of the preset reference variable and a grammatical and/or semantic feature set of the each variable in the object function; a third similarity calculating subunit, configured to calculate a similarity between the grammatical and/or semantic information set of the preset reference variable and the grammatical and/or semantic information set of the each variable in the object function, respectively; and a third selecting subunit, configured to select the target variable from the each variable in the object function based on a result of calculating the similarity.

In some embodiments, the positional information of the object function and the target variable in the to-be-recovered assembly program comprises a starting address of the object function and an offset of the target variable.

In some embodiments, the function information comprises at least one of: a function name, a constant in the function, and a calling relationship of the function.

In some embodiments, the grammatical and/or semantic information of the function comprises at least one of: a number of basic blocks, a control flow graph, an output corresponding to a sample input, and an analytical result of symbolic execution.

In some embodiments, the grammatical and/or semantic information of the variable comprises at least one of: a variable name, dependency relationship of the variable in a data flow or a control flow, and an analytical result of symbolic execution.

In some embodiments, the calculating a similarity comprises a minimum hash algorithm.

According to the method and the apparatus for detecting an application provided by the present disclosure, first a binary program of an application running on a target device is disassembled to generate a to-be-recovered assembly program. Next, a candidate function, an object function and a target variable in the to-be-recovered assembly program are selected in sequence based on the function information of a preset reference function, the grammatical and/or semantic information of the preset reference function and the grammatical and/or semantic information of the preset reference variable. Finally, the positional information of the object function and the target variable in the to-be-recovered assembly program are outputted as a detection result. In this way, an effective detection of the application running on the device is achieved.

BRIEF DESCRIPTION OF THE DRAWINGS

Other features, objectives and advantages of the present disclosure will become more apparent upon reading the detailed description to non-limiting embodiments with reference to the accompanying drawings, wherein.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
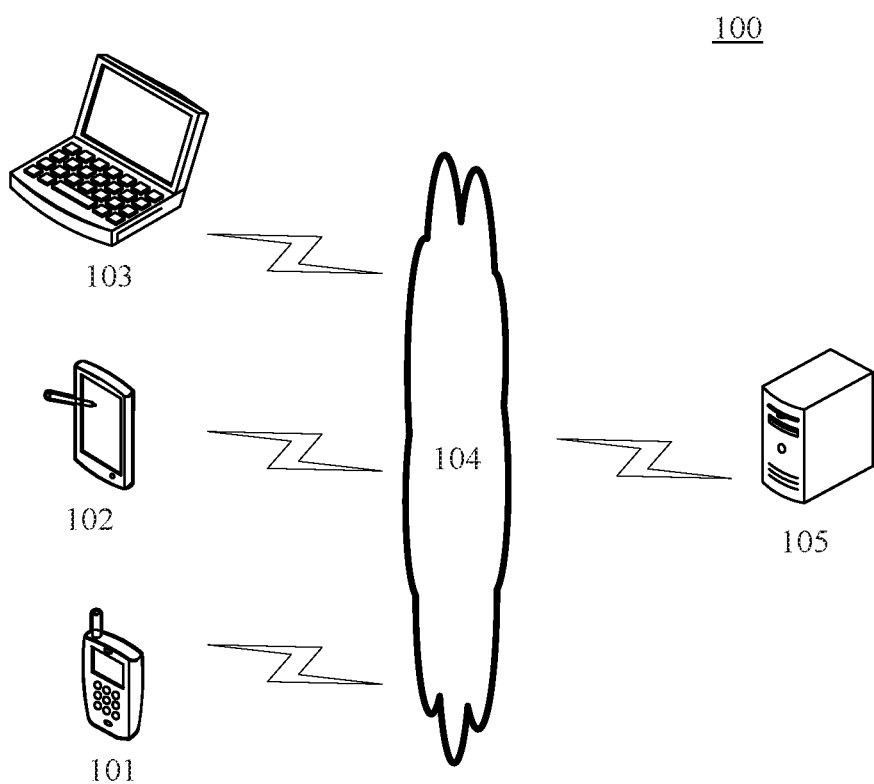
FIG. 1 is an exemplary architecture diagram of a system to which the present disclosure may be applied.

FIG. 1 shows an exemplary architecture of a system 100 to which the method or apparatus for detecting an application according to embodiments of the present application may be applied.

As shown in FIG. 1, the system architecture 100 may include target devices 101, 102 and 103, a network 104 and a server 105. The network 104 serves as a medium providing a communication link between the target devices 101, 102 and 103 and the server 105. The network 104 may include various types of connections, such as wired or wireless communication links, or optical fibers.

The target devices 101, 102, and 103 may be various electronic devices including, but not limited to, a smart phone, a tablet computer, an e-book reader, a Moving Picture Experts Group Audio Layer III (MP3) player, a Moving Picture Experts Group Audio Layer IV (MP4) player, a laptop portable computer, a desktop computer, and the like.

The server 105 may be a server providing various services, for example, a background server for detecting functions and variables to be recovered based on a binary program of an application running on the target devices 101, 102, and 103. The background server may disassemble the binary program of an application running on the target devices, perform processing, such as analysis, on the generated data (such as an assembly program to be recovered), and output the analysis result (for example, the positional information of the function and variable to be recovered).

It should be noted that the method for detecting an application according to the embodiments of the present application may be executed by the server 105. Accordingly, the apparatus for detecting an application may be set in the server 105.

It should be appreciated that the numbers of the target devices, the network and the server in FIG. 1 are merely illustrative. Any number of terminal devices, networks and servers may be provided based on the actual requirements.

Figure 2:
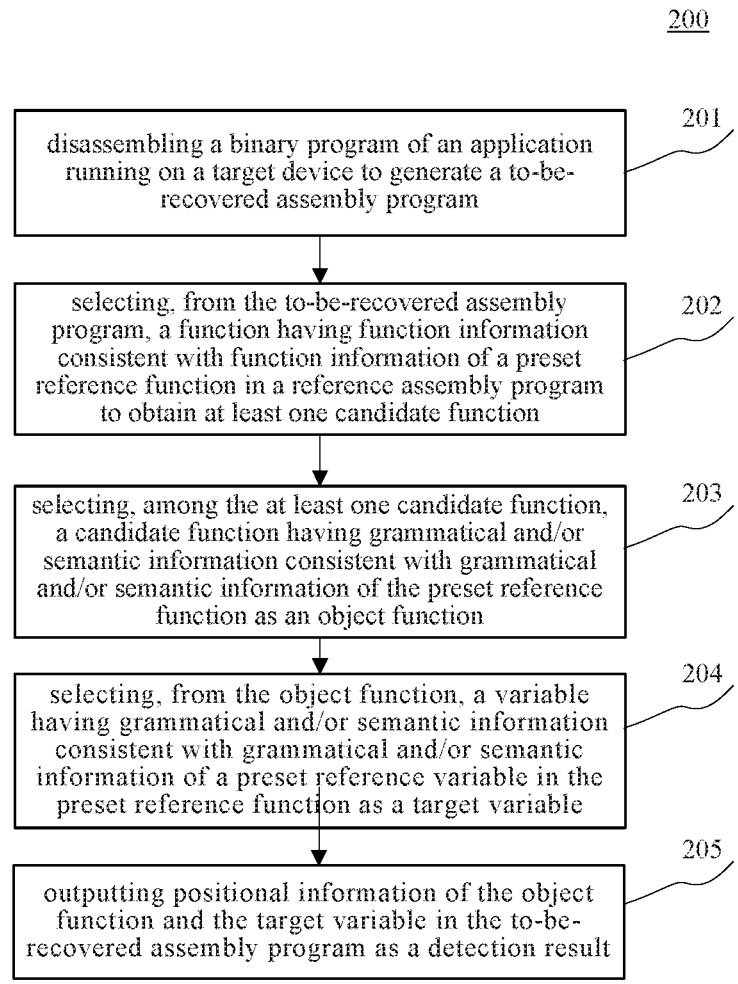
FIG. 2 is a flowchart of a method for detecting an application according to an embodiment of the present disclosure.

Referring to FIG. 2, it illustrates a flowchart 200 of a method for detecting an application according to an embodiment of the present disclosure. The method for detecting an application comprises following steps.

Step 201: disassembling a binary program of an application running on a target device to generate a to-be-recovered assembly program.

In this embodiment, in the event that a source code of the application running on the target device cannot be acquired, an electronic device (such as a server 105 as shown in FIG. 1) on which the method for detecting an application runs may acquire the binary program of the application running on the target device by way of wired connection or wireless connection, and disassemble the binary program using a disassembly program to generate the to-be-recovered assembly program. The disassembly program may be used for converting the binary program into an assembly program.

Step 202: selecting, from the to-be-recovered assembly program, a function having function information consistent with function information of a preset reference function in a reference assembly program to obtain at least one candidate function.

In this embodiment, based on the to-be-recovered assembly program acquired in Step 201, the electronic device (such as the server 105 as shown in FIG. 1) may first acquire function information of the preset reference function and each function in the to-be-recovered assembly program, then match, one by one, the function information of the preset reference function with the function information of the each function in the to-be-recovered assembly program, and finally select, based on the matching result (for example, a matching degree being greater than a preset threshold is regarded as consistent in function information), a function consistent in function information with the preset reference function from the to-be-recovered assembly program to serve as the candidate function. The reference assembly program is a preset reference program. The reference program may be an assembly program or a binary program. When the reference program is a binary program, the electronic device first needs to disassemble the reference program to acquire the reference assembly program. The preset reference function may be a function preassigned in the reference assembly program, or may be all functions in the reference assembly program, or may be partial functions in the reference assembly program.

In some optional implementations of this embodiment, the function information may comprise, but not limited to, at least one of: a function name, a constant in the function, and a calling relationship of the function. As an example, when the function information is the function name and the function name of the preset reference function is "ping_unhash", the electronic device may first acquire the function name of each function in the to-be-recovered assembly program, then match the "ping_unhash" with the function name of the each function in the to-be-recovered assembly program. When a function with the function name "ping_unhash" is present in the to-be-recovered assembly program, the function may be selected as the candidate function. When the function information is an calling relationship of functions, in the event that a preset reference function A calls a function B, the function B calls a preset reference function C, and the function B is present in the to-be-recovered assembly program, in the to-be-recovered assembly program, a function calling the function B and a function called by the function B may be both selected as the candidate function.

Step 203: selecting, among the at least one candidate function, a candidate function having grammatical and/or semantic information consistent with grammatical and/or semantic information of the preset reference function as an object function.

In this embodiment, based on the at least one candidate function acquired in Step 202, the electronic device (such as the server 105 as shown in FIG. 1) may first acquire grammatical and/or semantic information of the preset reference function and each candidate function, then match, one by one, the grammatical and/or semantic information of the preset reference function with the grammatical and/or semantic information of the each candidate function, and finally select, based on the matching result (for example, a matching degree being greater than a preset threshold is regarded as consistent in grammatical and/or semantic information of a function), a function consistent in grammatical and/or semantic information with the preset reference function from the candidate function to serve as the object function.

In this embodiment, first the candidate function is quickly matched based on a lightweight means matching with the function information adopted in Step 202 to narrow the matching range in Step 203, and then the object function is accurately acquired based on a precise localization means matching with the grammatical and/or semantic information of a function adopted in Step 203. In this way, not only localization inaccuracy caused by matching only adopting a lightweight matching means may be overcome, but also enormous resource expenditure caused by matching only adopting the precise localization means may be avoided.

In some optional implementations of this embodiment, the grammatical and/or semantic information of the function may comprise, but not limited to, at least one of: the number of basic blocks, a control flow graph, an output corresponding to a sample input, and an analytical result of symbolic execution. The basic block is a statement sequence executed in a program order, merely having an entry and an exit. The entry is a first statement of the basic block, and the exit is a last statement of the basic block. For a basic block, when being executed, a program only enters from the entry and quits from the exit. The control flow graph, also referred to as a control flow chart, is an abstract expression of a process or a program. Each node in a figure in the control flow graph represents a basic block. A jump target starts with a basic block and ends with another basic block. An oriented edge is used for representing a jump in the control flow. Generally, the matching degree between two control flow graphs of functions may be calculated using a backtracking algorithm. The output corresponding to the sample input, that is, a value range of an independent variable of a function is first determined, then the value range of the independent variable is sampled, and values of a plurality of independent variables obtained by sampling are used as input execution functions so as to acquire the corresponding output. The symbolic execution refers to a technique in which a symbol value is used to represent a value of a program variable and then a program execution is simulated to conduct a correlation analysis under the premise of not executing the program. The symbolic execution may analyze all semantic information of the program, or may only analyze partial semantic information.

Step 204: selecting, from the object function, a variable having grammatical and/or semantic information consistent with grammatical and/or semantic information of a preset reference variable in the preset reference function as a target variable.

In this embodiment, based on the object function acquired in Step 203, the electronic device (such as the server 105 as shown in FIG. 1) may first acquire grammatical and/or semantic information of the preset reference variable and each variable in the object function, then match, one by one, the grammatical and/or semantic information of the preset reference variable with the grammatical and/or semantic information of the each variable in the object function, and finally select, based on the matching result (for example, a matching degree being greater than a preset threshold is regarded as consistent in grammatical and/or semantic information of a variable), a variable consistent in grammatical and/or semantic information with the preset reference variable from the object function to serve as the target variable. The preset reference variable may be a variable preassigned in the preset reference function, or may be all variables in the preset reference function, or may be partial variables in the preset reference function.

In some optional implementations of this embodiment, the grammatical and/or semantic information of the variable may comprise, but not limited to, at least one of: a variable name, dependency relationship of the variable in a data flow or a control flow, and an analytical result of symbolic execution. As an example, following code snippets are present:

```
"int fun(int x){
    int y;
    y = x+1;
    if(y)
        return 0;
    else
        return 1;
}"
``` wherein, the variable y depends on the parameter x in data flow and depends on a determination of if/else in control flow, and the variable y may be located based on a dependency relationship between the data flow and the control flow.

Step 205: outputting positional information of the object function and the target variable in the to-be-recovered assembly program as a detection result.

In this embodiment, based on the object function acquired in Step 203 and the target variable acquired in Step 204, the electronic device (such as the server 105 as shown in FIG. 1) may acquire the positional information, in the to-be-recovered assembly program, of the object function and the target variable, and output the positional information as the detection result. Based on the positional information of the object function and the target variable in the detection result, the electronic device also may recover the object function and the target variable using a pre-configured patch.

In some optional implementations of this embodiment, the positional information of the object function and the target variable in the to-be-recovered assembly program comprises a starting address of the object function and an offset of the target variable.

According to the method provided by the embodiment of the present disclosure, first a binary program of an application running on a target device is disassembled to generate a to-be-recovered assembly program. Next, a candidate function, an object function and a target variable in the to-be-recovered assembly program are selected in sequence based on the function information of a preset reference function, the grammatical and/or semantic information of the preset reference function and the grammatical and/or semantic information of the preset reference variable. Finally, the positional information of the object function and the target variable in the to-be-recovered assembly program are outputted as a detection result. In this way, an effective detection of the application running on the device is achieved.

Figure 3:
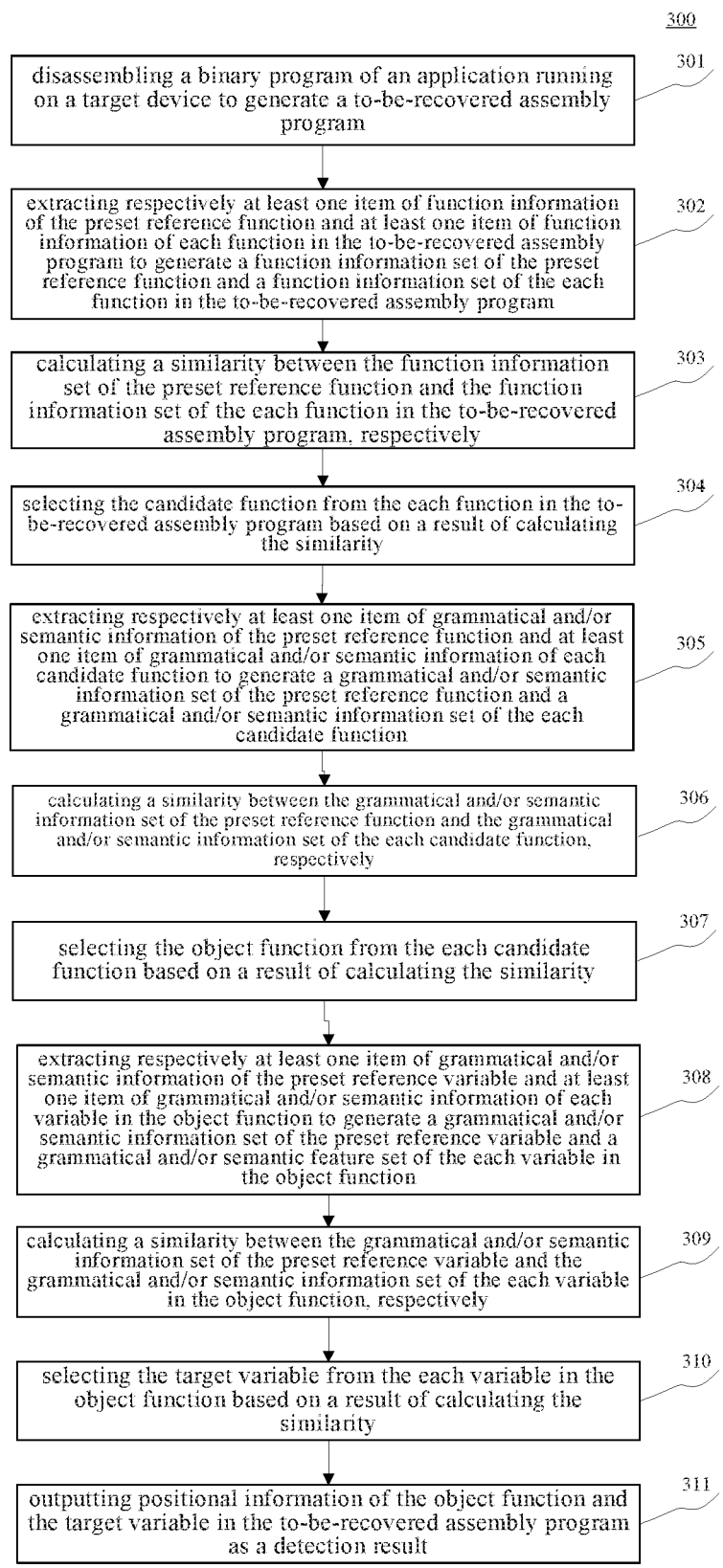
FIG. 3 is a flowchart of a method for detecting an application according to another embodiment of the present disclosure.

Further referring to FIG. 3, it illustrates a flowchart 300 of the method for detecting an application according to still another embodiment. The flowchart 300 of the method for detecting an application comprises following steps.

Step 301: disassembling a binary program of an application running on a target device to generate a to-be-recovered assembly program.

In this embodiment, in the event that a source code of the application running on the target device cannot be acquired, an electronic device (such as a server 105 as shown in FIG. 1) on which the method for detecting an application runs may acquire the binary program of the application running on the target device by way of wired connection or wireless connection, and disassemble the binary program using a disassembly program to generate the to-be-recovered assembly program. The disassembly program may be used for converting the binary program into an assembly program.

Step 302: extracting respectively at least one item of function information of the preset reference function and at least one item of function information of each function in the to-be-recovered assembly program to generate a function information set of the preset reference function and a function information set of the each function in the to-be-recovered assembly program.

In this embodiment, based on the to-be-recovered assembly program acquired in Step 301, the electronic device (such as the server 105 as shown in FIG. 1) may first respectively extract at least one item of function information of the preset reference function and at least one item of function information of each function in the to-be-recovered assembly program, then respectively summarize the function information of the preset reference function and the function information of the each function in the to-be-recovered assembly program, and finally generate the function information set of the preset reference function and the function information set of the each function in the to-be-recovered assembly program. As an example, the electronic device may first respectively extract a function name and an calling relationship of the preset reference function as well as a function name and an calling relationship of each function in the to-be-recovered assembly program, then summarize the function name and the calling relationship of the preset reference function to generate the function information set of the preset reference function, and summarize the function name and the calling relationship of the each function in the to-be-recovered assembly program to generate the function information set of the each function in the to-be-recovered assembly program.

Step 303: calculating a similarity between the function information set of the preset reference function and the function information set of the each function in the to-be-recovered assembly program, respectively.

In this embodiment, based on the function information set of the preset reference function and the function information set of the each function in the to-be-recovered assembly program acquired in Step 302, the electronic device (such as the server 105 as shown in FIG. 1) may perform a similarity calculation on the function information set of the preset reference function and the function information set of the each function in the to-be-recovered assembly program respectively.

In this embodiment, the electronic device may perform a similarity calculation using widely-known similarity calculation methods such as a cosine similarity algorithm or a Jaccard coefficient algorithm. Taking the Jaccard coefficient algorithm as an example, the similarity between two function information sets of functions in the electronic device is equal to the quantity of common function information between the two function information sets divided by the quantity of function information included in the two function information sets of functions.

Step 304: selecting the candidate function from the each function in the to-be-recovered assembly program based on a result of calculating the similarity.

In this embodiment, based on the similarity calculation result acquired in Step 303, the electronic device (such as the server 105 as shown in FIG. 1) may compare, according to a preset threshold, the similarity with the preset threshold (for example, the similarity value should be greater than the preset threshold), and select the candidate function from the each function in the to-be-recovered assembly program.

Step 305: extracting respectively at least one item of grammatical and/or semantic information of the preset reference function and at least one item of grammatical and/or semantic information of each candidate function to generate a grammatical and/or semantic information set of the preset reference function and a grammatical and/or semantic information set of the each candidate function.

In this embodiment, based on the candidate function acquired in Step 304, the electronic device (such as the server 105 as shown in FIG. 1) may first extract respectively at least one item of grammatical and/or semantic information of the preset reference function and at least one item of grammatical and/or semantic information of the each candidate function, then respectively summarize the grammatical and/or semantic information of the preset reference function and the grammatical and/or semantic information of the each candidate function, and finally generate a grammatical and/or semantic information set of the preset reference function and the grammatical and/or semantic information set of the each candidate function. As an example, the electronic device may first respectively extract the number of basic blocks and a control flow graph of the preset reference function, the number of basic blocks and a control flow graph of each candidate function, then summarize the number of the basic blocks and the control flow graph of the preset reference function to generate the grammatical and/or semantic information set of the preset reference function, and summarize the number of the basic blocks and the control flow graph of the each candidate function to generate the grammatical and/or semantic information set of the each function in the to-be-recovered assembly program.

Step 306: calculating a similarity between the grammatical and/or semantic information set of the preset reference function and the grammatical and/or semantic information set of the each candidate function, respectively.

In this embodiment, based on the grammatical and/or semantic information set of the preset reference function and the grammatical and/or semantic information set of the each candidate function acquired in Step 305, the electronic device (such as the server 105 as shown in FIG. 1) may perform a similarity calculation on the grammatical and/or semantic information set of the preset reference function and the grammatical and/or semantic information set of the each candidate function respectively.

In this embodiment, the electronic device may perform a similarity calculation using widely-known similarity calculation methods such as a cosine similarity algorithm or a Jaccard coefficient algorithm. Taking the Jaccard coefficient algorithm as an example, the similarity between two grammatical and/or semantic information sets of functions in the electronic device is equal to the quantity of common grammatical and/or semantic information between the two grammatical and/or semantic information sets of functions divided by the quantity of grammatical and/or semantic information included in the two grammatical and/or semantic information sets of functions.

Step 307: selecting the object function from the each candidate function based on a result of calculating the similarity.

In this embodiment, based on the similarity calculation result acquired in Step 306, the electronic device (such as the server 105 as shown in FIG. 1) may compare, according to a preset threshold, the similarity with the preset threshold (for example, the similarity value should be greater than the preset threshold), and select the object function from the each candidate function.

Step 308: extracting respectively at least one item of grammatical and/or semantic information of the preset reference variable and at least one item of grammatical and/or semantic information of each variable in the object function to generate a grammatical and/or semantic information set of the preset reference variable and a grammatical and/or semantic feature set of the each variable in the object function.

In this embodiment, based on the object function acquired in Step 307, the electronic device (such as the server 105 as shown in FIG. 1) may first respectively extract at least one item of grammatical and/or semantic information of the preset reference variable and at least one item of grammatical and/or semantic information of each variable in the object function, then respectively summarize the grammatical and/or semantic information of the preset reference variable and the grammatical and/or semantic information of the each variable in the object function, and finally generate a grammatical and/or semantic information set of the preset reference variable and a grammatical and/or semantic information set of the each variable in the object function. As an example, the electronic device may first respectively extract a dependency relationship of the preset reference variable in a data flow, a dependency relationship of the preset reference variable in a control flow as well as a dependency relationship, of each variable in the object function, in a data flow, and a dependency relationship of each variable in the object function, in a control flow, and then summarize the dependency relationship of the preset reference variable in the data flow and the dependency relationship of the preset reference variable in the control flow to generate a grammatical and/or semantic information set of the preset reference variable, and summarize the dependency relationship, of each variable in the object function, in the data flow and the dependency relationship of each variable in the object function, in the control flow to generate a grammatical and/or semantic information set of the each variable in the object function.

Step 309: calculating a similarity between the grammatical and/or semantic information set of the preset reference variable and the grammatical and/or semantic information set of the each variable in the object function, respectively.

In this embodiment, based on the grammatical and/or semantic information set of the preset reference function and the grammatical and/or semantic feature set of the each variable in the object function acquired in Step 308, the electronic device (such as the server 105 as shown in FIG. 1) may perform a similarity calculation on the grammatical and/or semantic information set of the preset reference function and the grammatical and/or semantic information set of the each variable in the object function respectively.

In this embodiment, the electronic device may perform a similarity calculation using widely-known similarity calculation methods such as a cosine similarity algorithm or a Jaccard coefficient algorithm. Taking the Jaccard coefficient algorithm as an example, the similarity between two grammatical and/or semantic information sets of variables in the electronic device is equal to the quantity of common grammatical and/or semantic information between the two grammatical and/or semantic information sets of the variables divided by the quantity of grammatical and/or semantic information included in the two grammatical and/or semantic information sets of the variables.

Step 310: selecting the target variable from the each variable in the object function based on a result of calculating the similarity.

In this embodiment, based on the similarity calculation result acquired in Step 309, the electronic device (such as the server 105 as shown in FIG. 1) may compare, according to a preset threshold, the similarity with the preset threshold (for example, the similarity value should be greater than the preset threshold), and select the target variable from the each variable in the object function.

In some optional implementations of this embodiment, the method for performing a similarity calculation may comprise a minimum hash algorithm. The minimum hash (MinHash) is a locality sensitive hash (LSH), and may be used for quickly estimating the similarity between two sets.

Step 311: outputting positional information of the object function and the target variable in the to-be-recovered assembly program as a detection result.

In this embodiment, based on the object function acquired in Step 307 and the target variable acquired in Step 310, the electronic device (such as the server 105 as shown in FIG. 1) may acquire the positional information, in the to-be-recovered assembly program, of the object function and the target variable, and output the positional information as the detection result. Based on the positional information of the object function and the target variable in the detection result, the electronic device also may recover the object function and the target variable using a pre-configured patch.

As can be seen from FIG. 3, compared with the embodiment corresponding to FIG. 2, the flow 300 of the method for detecting an application in this embodiment highlights the step of selecting the object function and the target variable based on the similarity calculation. As thus, the solution as described in this embodiment implements to more accurately and quickly detect an application using a similarity calculation.

Figure 4:
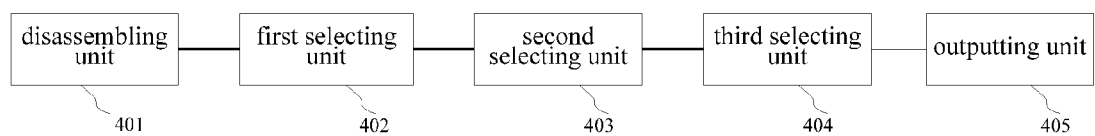
FIG. 4 is a schematic structural diagram of an apparatus for detecting an application according to an embodiment of the present disclosure.

Further referring to FIG. 4, as an implementation of the method as shown in the foregoing figures, the present disclosure provides an embodiment of an apparatus for detecting an application. The apparatus embodiment corresponds to the method embodiment as shown in FIG. 2, and the apparatus specifically may be used in various electronic devices.

As shown in FIG. 4, the apparatus 400 for detecting an application of this embodiment comprises: a disassembling unit 401, a first selecting unit 402, a second selecting unit 403, a third selecting unit 404 and an outputting unit 405. The disassembling unit 401 is configured to disassemble a binary program of an application running on a target device to generate a to-be-recovered assembly program. The first selecting unit 402 is configured to select, from the to-be-recovered assembly program, a function having function information consistent with function information of a preset reference function in a reference assembly program to obtain at least one candidate function. The second selecting unit 403 is configured to select, among the at least one candidate function, a candidate function having grammatical and/or semantic information consistent with grammatical and/or semantic information of the preset reference function as an object function. The third selecting unit 404 is configured to select, from the object function, a variable having grammatical and/or semantic information consistent with grammatical and/or semantic information of a preset reference variable in the preset reference function as a target variable. The outputting unit 405 is configured to output positional information of the object function and the target variable in the to-be-recovered assembly program as a detection result.

In the apparatus 400 for detecting an application of this embodiment, concrete treatments of the disassembling unit 401, the first selecting unit 402, the second selecting unit 403, the third selecting unit 404 and the outputting unit 405 and beneficial effects caused by the same may refer to related description of Step 201, Step 202, Step 203, Step 204 and Step 205 in corresponding embodiments in FIG. 2, which are not repeated any more herein.

In some optional implementations of this embodiment, the first selecting unit 402 comprises: a first extracting subunit, configured to extract respectively at least one item of function information of the preset reference function and at least one item of function information of each function in the to-be-recovered assembly program to generate a function information set of the preset reference function and a function information set of the each function in the to-be-recovered assembly program; a first similarity calculating subunit, configured to calculating a similarity between the function information set of the preset reference function and the function information set of the each function in the to-be-recovered assembly program, respectively; and a first selecting subunit, configured to select the candidate function from the each function in the to-be-recovered assembly program based on a result of calculating the similarity.

In some optional implementations of this embodiment, the second selecting unit 403 comprises: a second extracting subunit, configured to extract respectively at least one item of grammatical and/or semantic information of the preset reference function and at least one item of grammatical and/or semantic information of each candidate function to generate a grammatical and/or semantic information set of the preset reference function and a grammatical and/or semantic information set of the each candidate function; a second similarity calculating subunit, configured to calculate a similarity between the grammatical and/or semantic information set of the preset reference function and the grammatical and/or semantic information set of the each candidate function, respectively; and a second selecting subunit, configured to select the object function from the each candidate function based on a result of calculating the similarity.

In some optional implementations of this embodiment, the third selecting unit 404 comprises: a third extracting subunit, configured to extract respectively at least one item of grammatical and/or semantic information of the preset reference variable and at least one item of grammatical and/or semantic information of each variable in the object function to generate a grammatical and/or semantic information set of the preset reference variable and a grammatical and/or semantic feature set of the each variable in the object function; a third similarity calculating subunit, configured to calculate a similarity between the grammatical and/or semantic information set of the preset reference variable and the grammatical and/or semantic information set of the each variable in the object function, respectively; and a third selecting subunit, configured to select the target variable from the each variable in the object function based on a result of calculating the similarity.

In some optional implementations of this embodiment, the positional information of the object function and the target variable in the to-be-recovered assembly program comprises a starting address of the object function and an offset of the target variable.

In some optional implementations of this embodiment, the function information comprises at least one of: a function name, a constant in the function, and a calling relationship of the function.

In some optional implementations of this embodiment, the grammatical and/or semantic information of the function comprises at least one of: a number of basic blocks, a control flow graph, an output corresponding to a sample input, and an analytical result of symbolic execution.

In some optional implementations of this embodiment, the grammatical and/or semantic information of the variable comprises at least one of: a variable name, dependency relationship of the variable in a data flow or a control flow, and an analytical result of symbolic execution.

In some optional implementations of this embodiment, the calculating a similarity comprises a minimum hash algorithm.

Figure 5:
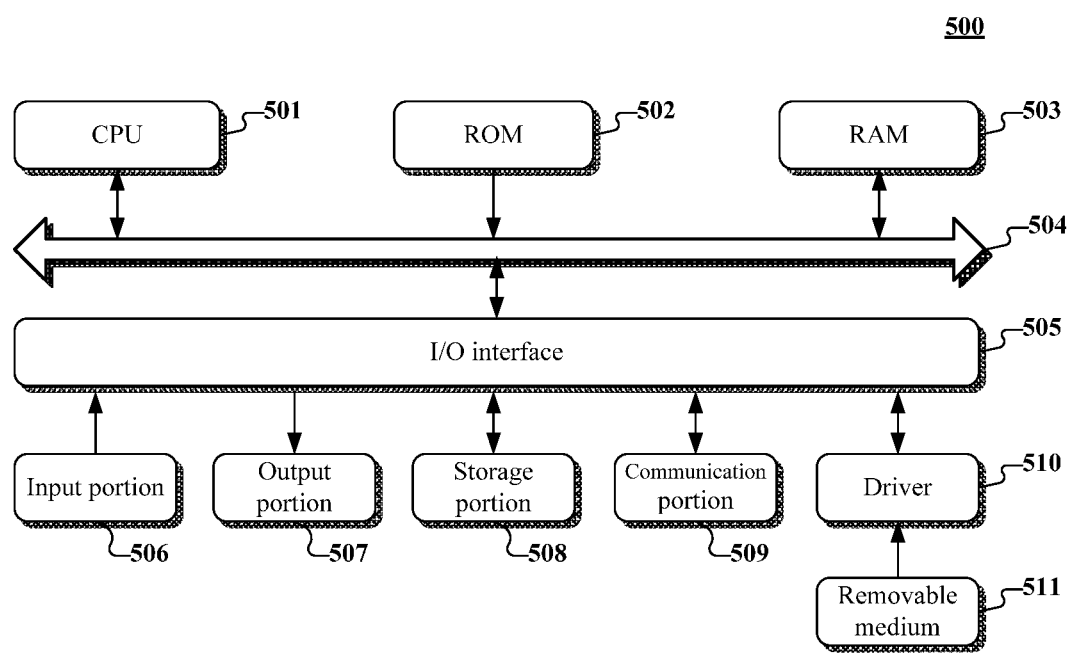
FIG. 5 illustrates a structural schematic diagram of a computer system adapted to implement a server of the embodiments of the present disclosure.

Referring to FIG. 5, a schematic structural diagram of a computer system 500 adapted to implement a server of the embodiments of the present disclosure is shown.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to an embodiment of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 509, and/or may be installed from the removable media 511. The computer program, when executed by the CPU 501, implements the functions as defined by the methods of the present disclosure.

The flowcharts and block diagrams in the figures illustrate architectures, functions and operations that may be implemented according to the system, the method and the computer program product of the various embodiments of the present disclosure. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present disclosure may be implemented by way of software or hardware. The described units or modules may also be provided in a processor, for example, described as: a processor, comprising a disassembling unit, a first selecting unit, a second selecting unit, a third selecting unit and an outputting unit, where the names of these units or modules are not considered as a limitation to the units or modules. For example, the disassembling unit may also be described as "a unit for disassembling a binary program of an application running on a target device to generate a to-be-recovered assembly program".

In another aspect, the present disclosure further provides a non-transitory computer storage medium. The non-transitory computer storage medium may be the non-transitory computer storage medium included in the apparatus in the above embodiments, or a stand-alone non-transitory computer storage medium which has not been assembled into the apparatus. The non-transitory computer storage medium stores one or more programs. The one or more programs, when executed by a device, cause the device to: disassemble a binary program of an application running on a target device to generate a to-be-recovered assembly program; select, from the to-be-recovered assembly program, a function having function information consistent with function information of a preset reference function in a reference assembly program to obtain at least one candidate function; select, among the at least one candidate function, a candidate function having grammatical and/or semantic information consistent with grammatical and/or semantic information of the preset reference function as an object function; select, from the object function, a variable having grammatical and/or semantic information consistent with grammatical and/or semantic information of a preset reference variable in the preset reference function as a target variable; and output positional information of the object function and the target variable in the to-be-recovered assembly program as a detection result.

The foregoing is only a description of the preferred embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. A method for detecting an application, comprising:
   disassembling a binary program of an application running on a target device to generate a to-be-recovered assembly program;
   selecting, from the to-be-recovered assembly program, a function having function information consistent with function information of a preset reference function in a reference assembly program to obtain at least one candidate function, wherein a matching degree between the function information of the function selected from the to-be-recovered assembly program and the consistent function information of the preset reference function in the reference assembly program is greater than a preset threshold, and the matching degree comprises at least one of: a matching degree between function names, a matching degree between constants in the functions, or a matching degree between calling relationships of the functions;
   selecting, among the at least one candidate function, the candidate function having grammatical and/or semantic information consistent with grammatical and/or semantic information of the preset reference function as an object function;
   selecting, from the object function, a variable having grammatical and/or semantic information consistent with grammatical and/or semantic information of a preset reference variable in the preset reference function as a target variable; and
   outputting positional information of the object function and the target variable in the to-be-recovered assembly program as a detection result.

2. The method according to claim 1, wherein the selecting, from the to-be-recovered assembly program, a function having function information consistent with function information of the preset reference function in the reference assembly program to obtain at least one candidate function comprises:
   extracting respectively at least one item of function information of the preset reference function and at least one item of function information of each function in the to-be-recovered assembly program to generate a function information set of the preset reference function and a function information set of the each function in the to-be-recovered assembly program;
   calculating a similarity between the function information set of the preset reference function and the function information set of the each function in the to-be-recovered assembly program, respectively; and
   selecting the candidate function from the each function in the to-be-recovered assembly program based on a result of calculating the similarity.

3. The method according to claim 1, wherein the selecting, among the at least one candidate function, a candidate function having grammatical and/or semantic information consistent with grammatical and/or semantic information of the preset reference function as the object function comprises:
   extracting respectively at least one item of grammatical and/or semantic information of the preset reference function and at least one item of grammatical and/or semantic information of each candidate function to generate a grammatical and/or semantic information set of the preset reference function and a grammatical and/or semantic information set of the each candidate function;
   calculating a similarity between the grammatical and/or semantic information set of the preset reference function and the grammatical and/or semantic information set of the each candidate function, respectively; and
   selecting the object function from the each candidate function based on a result of calculating the similarity.

4. The method according to claim 1, wherein the selecting, from the object function, a variable having grammatical and/or semantic information consistent with grammatical and/or semantic information of a preset reference variable in the preset reference function as a target variable comprises:

extracting respectively at least one item of grammatical and/or semantic information of the preset reference variable and at least one item of grammatical and/or semantic information of each variable in the object function to generate a grammatical and/or semantic information set of the preset reference variable and a grammatical and/or semantic feature set of the each variable in the object function;

calculating a similarity between the grammatical and/or semantic information set of the preset reference variable and the grammatical and/or semantic information set of the each variable in the object function, respectively; and selecting the target variable from the each variable in the object function based on a result of calculating the similarity.

5. The method according to claim 1, wherein the positional information of the object function and the target variable in the to-be-recovered assembly program comprises a starting address of the object function and an offset of the target variable.

6. The method according to claim 1, wherein the grammatical and/or semantic information of the function comprises at least one of: a number of basic blocks, a control flow graph, an output corresponding to a sample input, and an analytical result of symbolic execution.

7. The method according to claim 1, wherein the grammatical and/or semantic information of the variable comprises at least one of: a variable name, dependency relationship of the variable in a data flow or a control flow, and an analytical result of symbolic execution.

8. The method according to claim 2, wherein the calculating a similarity comprises a minimum hash algorithm.

9. An apparatus for detecting an application, comprising:
at least one processor; and
a memory storing instructions, which when executed by the at least one processor, cause the at least one processor to perform operations, the operations comprising:

disassembling a binary program of an application running on a target device to generate a to-be-recovered assembly program;

selecting, from the to-be-recovered assembly program, a function having function information consistent with function information of a preset reference function in a reference assembly program to obtain at least one candidate function, wherein a matching degree between the function information of the function selected from the to-be-recovered assembly program and the consistent function information of the preset reference function in the reference assembly program is greater than a preset threshold, and the function information comprises at least one of: a function name, a constant in the function, or a calling relationship of the function;

selecting, among the at least one candidate function, a candidate function having grammatical and/or semantic information consistent with grammatical and/or semantic information of the preset reference function as an object function;

selecting, from the object function, a variable having grammatical and/or semantic information consistent with grammatical and/or semantic information of a preset reference variable in the preset reference function as a target variable; and outputting positional information of the object function and the target variable in the to-be-recovered assembly program as a detection result.

10. The apparatus according to claim 9, wherein the selecting, from the to-be-recovered assembly program, a function having function information consistent with function information of the preset reference function in a reference assembly program to obtain at least one candidate function comprises:

extracting respectively at least one item of function information of the preset reference function and at least one item of function information of each function in the to-be-recovered assembly program to generate a function information set of the preset reference function and a function information set of the each function in the to-be-recovered assembly program;

calculating a similarity between the function information set of the preset reference function and the function information set of the each function in the to-be-recovered assembly program, respectively; and selecting the candidate function from the each function in the to-be-recovered assembly program based on a result of calculating the similarity.

11. The apparatus according to claim 9, wherein the selecting, among the at least one candidate function, a candidate function having grammatical and/or semantic information consistent with grammatical and/or semantic information of the preset reference function as an object function comprises:

extracting respectively at least one item of grammatical and/or semantic information of the preset reference function and at least one item of grammatical and/or semantic information of each candidate function to generate a grammatical and/or semantic information set of the preset reference function and a grammatical and/or semantic information set of the each candidate function;

calculating a similarity between the grammatical and/or semantic information set of the preset reference function and the grammatical and/or semantic information set of the each candidate function, respectively; and selecting the object function from the each candidate function based on a result of calculating the similarity.

12. The apparatus according to claim 9, wherein the selecting, from the object function, a variable having grammatical and/or semantic information consistent with grammatical and/or semantic information of a preset reference variable in the preset reference function as a target variable comprises:

extracting respectively at least one item of grammatical and/or semantic information of the preset reference variable and at least one item of grammatical and/or semantic information of each variable in the object function to generate a grammatical and/or semantic information set of the preset reference variable and a grammatical and/or semantic feature set of the each variable in the object function;

calculating a similarity between the grammatical and/or semantic information set of the preset reference variable and the grammatical and/or semantic information set of the each variable in the object function, respectively; and selecting the target variable from the each variable in the object function based on a result of calculating the similarity.

13. The apparatus according to claim 9, wherein the positional information of the object function and the target variable in the to-be-recovered assembly program comprises a starting address of the object function and an offset of the target variable.

14. The apparatus according to claim 9, wherein the grammatical and/or semantic information of the function comprises at least one of: a number of basic blocks, a control flow graph, an output corresponding to a sample input, and an analytical result of symbolic execution.

15. The apparatus according to claim 9, wherein the grammatical and/or semantic information of the variable comprises at least one of: a variable name, dependency relationship of the variable in a data flow or a control flow, and an analytical result of symbolic execution.

16. The apparatus according to claim 10, wherein the calculating a similarity comprises a minimum hash algorithm.

17. A non-transitory storage medium storing one or more programs, the one or more programs when executed by an apparatus, causing the apparatus to perform operations, the operations comprising:

disassembling a binary program of an application running on a target device to generate a to-be-recovered assembly program;

selecting, from the to-be-recovered assembly program, a function having function information consistent with function information of a preset reference function in a reference assembly program to obtain at least one candidate function, wherein a matching degree between the function information of the function selected from the to-be-recovered assembly program and the consistent function information of the preset reference function in the reference assembly program is greater than a preset threshold, and the function information comprises at least one of: a function name, a constant in the function, or a calling relationship of the function;

selecting, among the at least one candidate function, a candidate function having grammatical and/or semantic information consistent with grammatical and/or semantic information of the preset reference function as an object function;

selecting, from the object function, a variable having grammatical and/or semantic information consistent with grammatical and/or semantic information of a preset reference variable in the preset reference function as a target variable; and outputting positional information of the object function and the target variable in the to-be-recovered assembly program as a detection result.

18. The method according to claim 1, the function having an identical name as a name of the preset reference function is selected from the to-be-recovered assembly program as the candidate function.

19. The method according to claim 1, the function having an identical calling relationship as a calling relationship of the preset reference function is selected from the to-be-recovered assembly program as the candidate function.

* * * * *